May 13, 1958
R. V. ADAIR ET AL
2,834,592
ROLLING QUENCH MACHINE
Filed Aug. 19, 1952
11 Sheets-Sheet 2
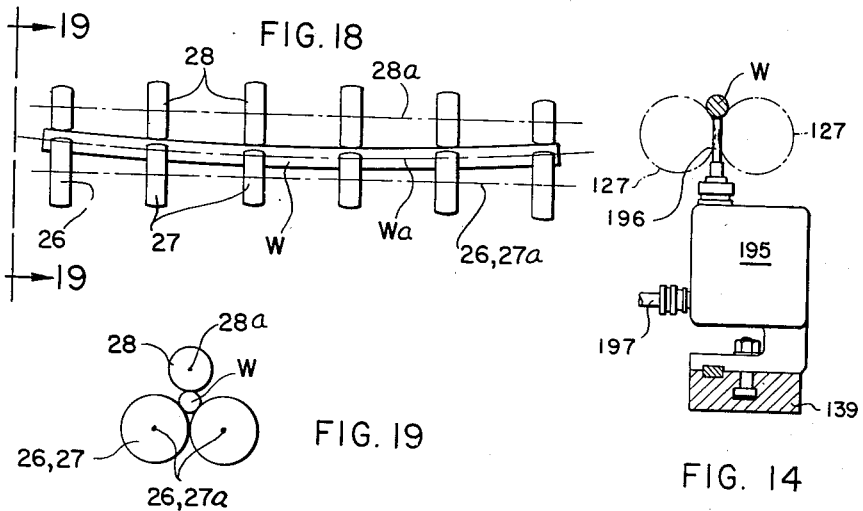
FIG. 18
FIG. 19
FIG. 14
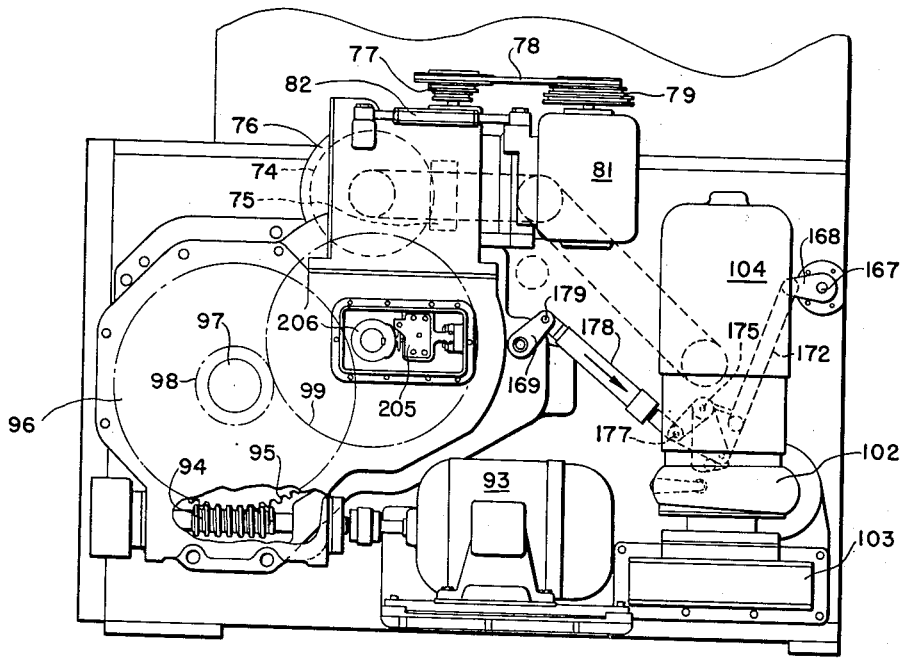
FIG. 2
INVENTORS
ROBERT V. ADAIR
LEONARD O. CARLSEN
BY EARL D. DAMMERT
Richard W. Treverton
ATTORNEY May 13, 1958

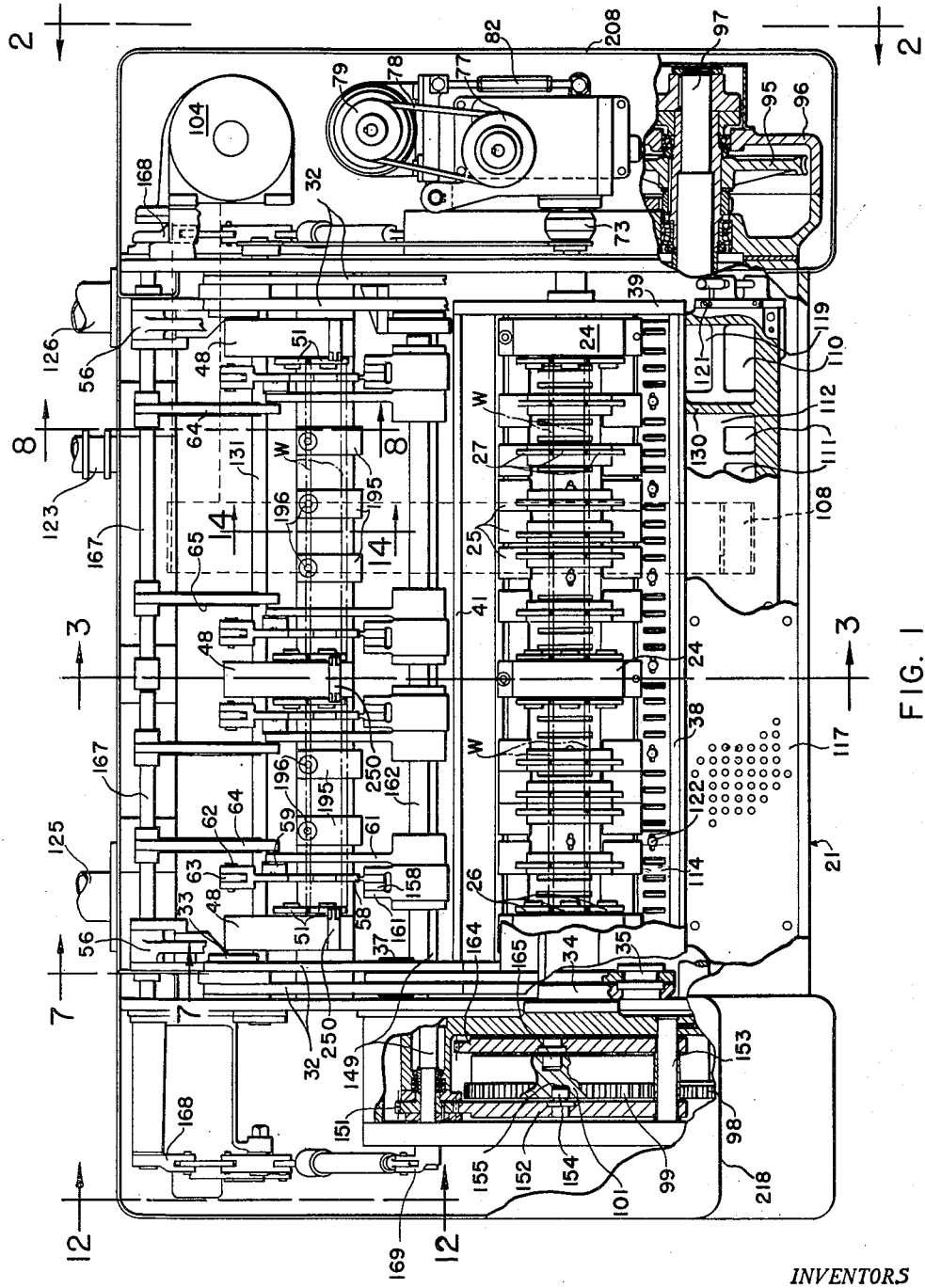

R. V. ADAIR ET AL 2,834,592

ROLLING QUENCH MACHINE

Filed Aug. 19, 1952

INVENTORS
ROBERT V. ADAIR
LEONARD O. CARLSEN
BY  EARL D. DAMMERT

Richard W. Treverton
ATTORNEY

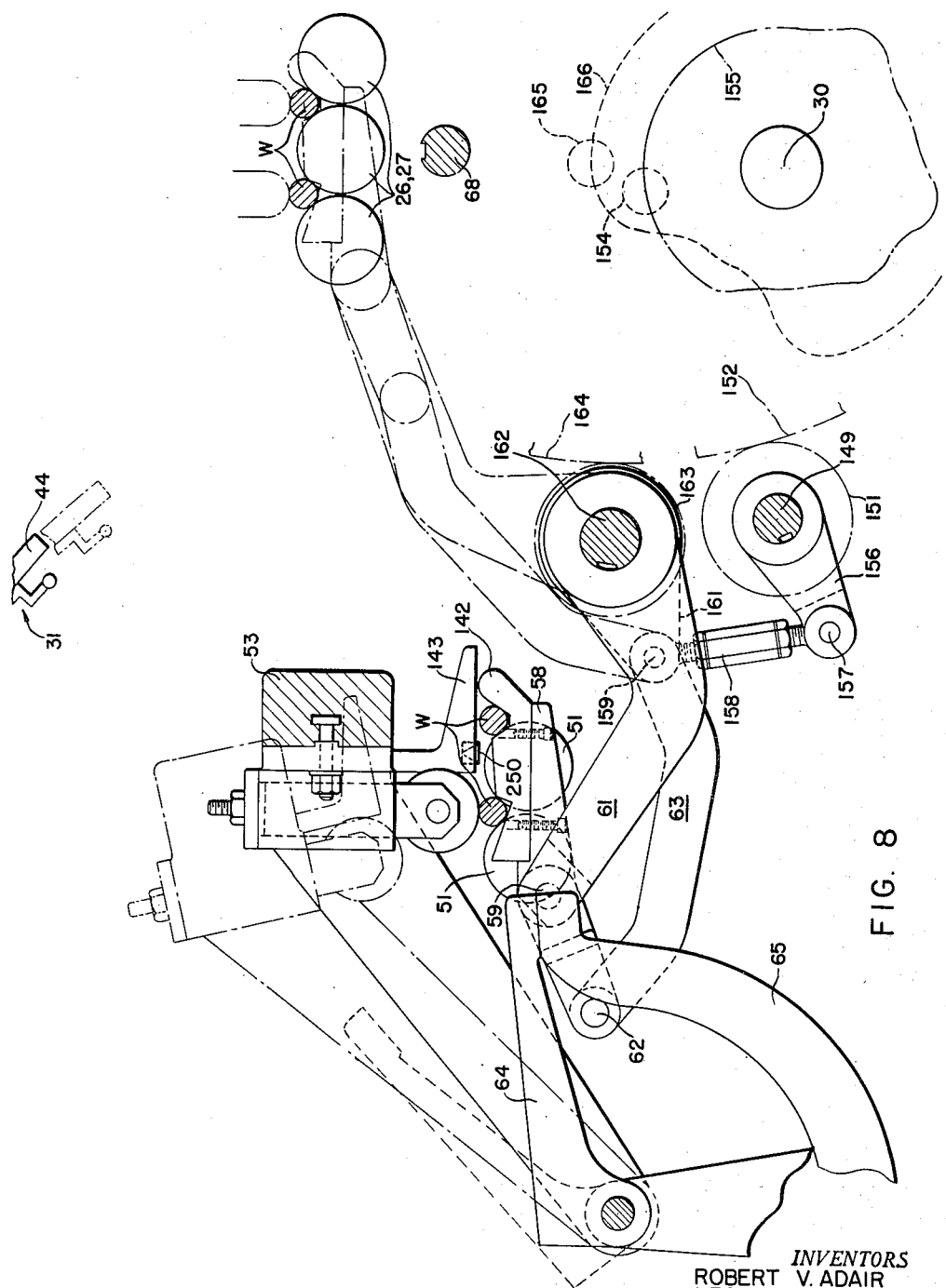

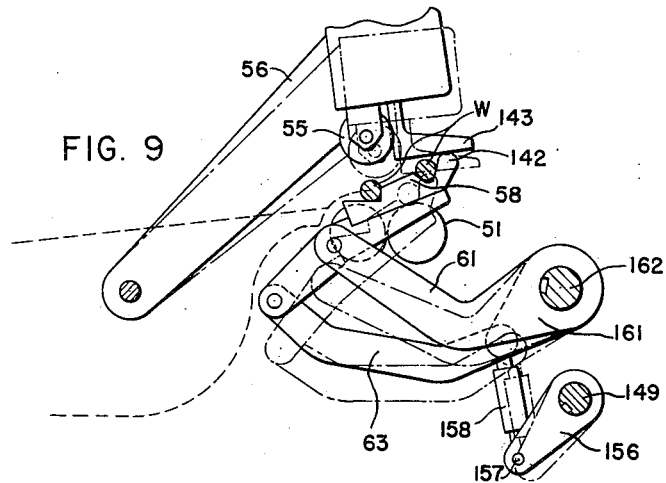
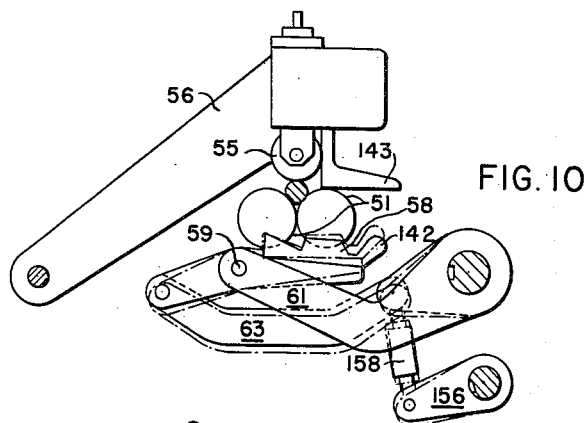
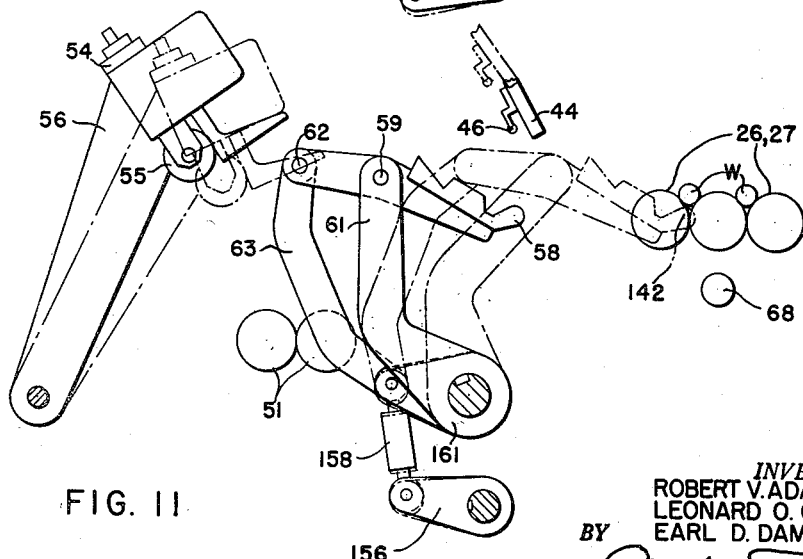

INVENTORS
ROBERT V. ADAIR
LEONARD O. CARLSEN
EARL D. DAMMERT
BY Richard W. Treverton
ATTORNEY

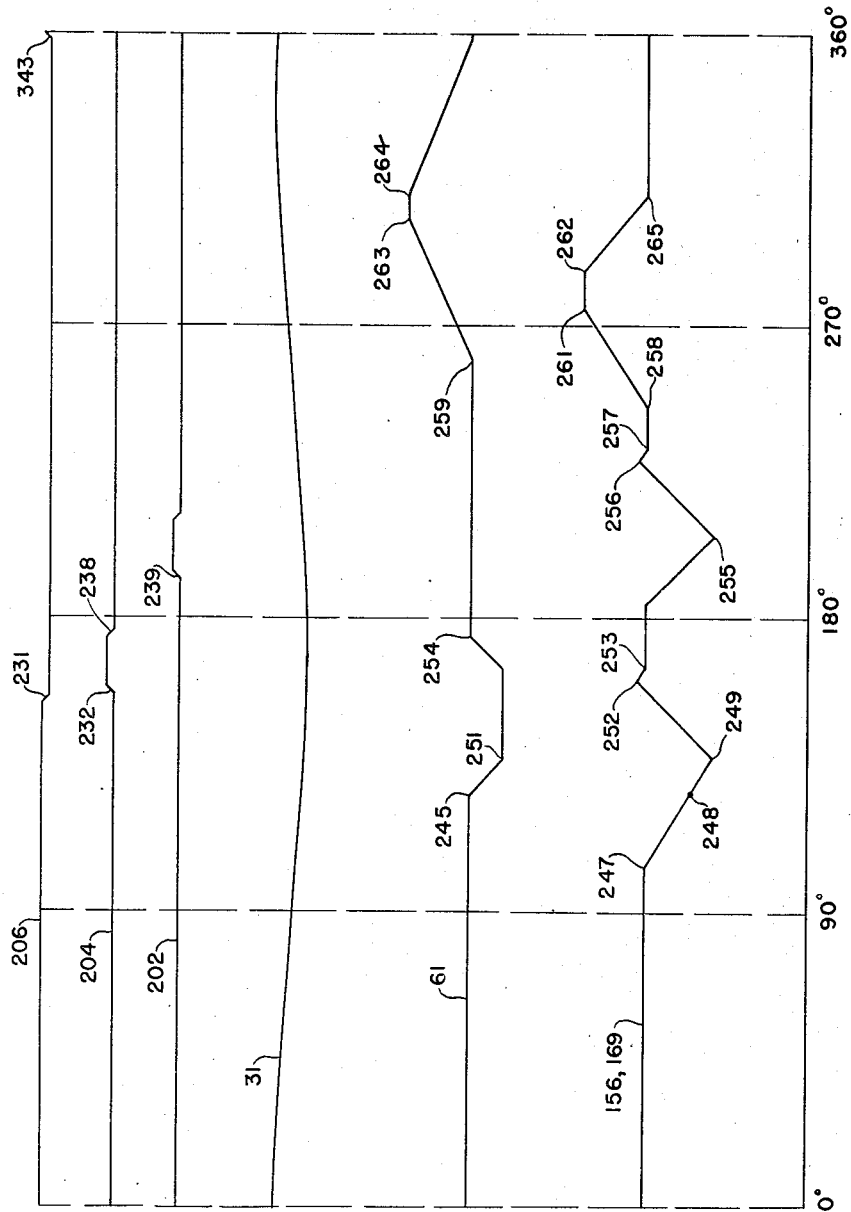

May 13, 1958 R. V. ADAIR ET AL 2,834,592
ROLLING QUENCH MACHINE
Filed Aug. 19, 1952 11 Sheets-Sheet 10

INVENTORS
ROBERT V. ADAIR
LEONARD O. CARLSEN
BY EARL D. DAMMERT
Richard W. Treverton
ATTORNEY

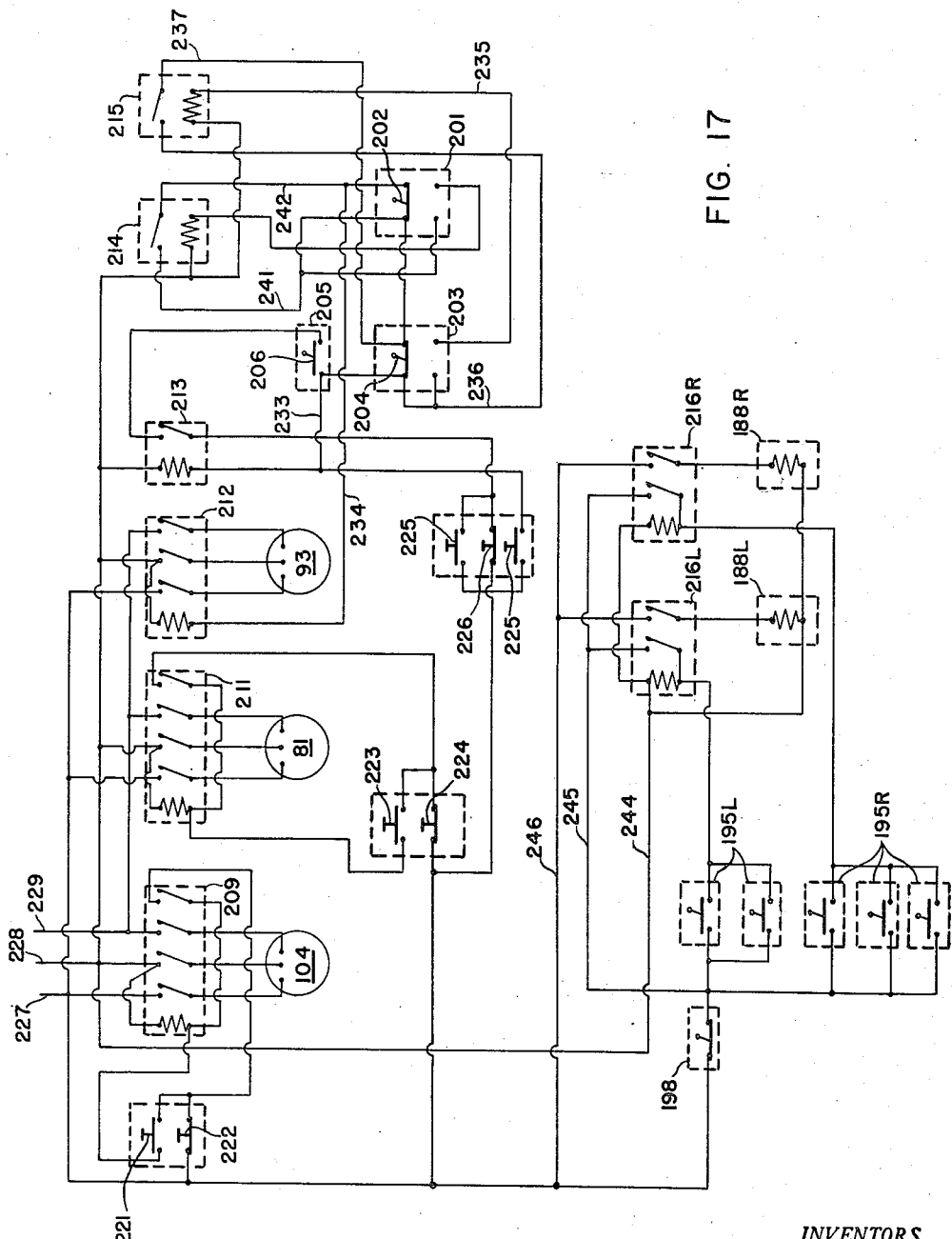

United States Patent Office 2,834,592
Patented May 13, 1958

2,834,592

ROLLING QUENCH MACHINE

Robert V. Adair and Leonard O. Carlsen, Rochester, and Earl D. Dammert, Penfield, N. Y., assignors to The Gleason Works, Rochester, N. Y., a corporation of New York Application August 19, 1952, Serial No. 305,262

14 Claims. (Cl. 266—6)

The present invention relates to a machine for rolling elongated quench hardenable work pieces of generally cylindrical shape between straightening rollers while subjecting them to a liquid quenching operation.

According to the invention the machine has a quenching chamber containing lower rollers for supporting the work, the latter being clamped against these rollers by upper rollers carried by a movable pressure head. The latter is lowered and raised to carry the upper rollers to and from their operative position. A pump means continuously supplies liquid to the quenching chamber and the latter has a stationary wall portion of such height that flow over it maintains the level of the liquid below the work supported on the lower rollers. The chamber wall structure also includes a movable wall portion adapted to co-operate, in one position thereof, with said stationary wall portion to increase the overflow height of the chamber wall structure sufficiently to raise the level of the liquid above the work on the lower rollers, for thereby quenching the work. Power operated means is provided to lower and raise the pressure head and, in time therewith, to move said movable wall portion to and from its position wherein the liquid level is raised for quenching. In fact it is preferred that said movable wall portion be connected to the pressure head to move as a unit with it.

The lowering and raising of the pressure head is a swinging motion effected by electric motor operated means including a rotary crank at each side of the machine and a pitman connecting each crank to the pressure head. Motor control means are provided, preferably in the form of cam actuated switches operated in time with the cranks, to stop the motor when the pressure head is lowered and then restart it after a time interval. During this interval liquid rises in the quenching chamber to cover the work and flows over the work for a time sufficient to effect quenching. After being restarted the motor is again stopped when the pressure head has been raised slightly from its lowermost position and after another time interval is again started. This second time interval permits the liquid to drain from the quench chamber at a time when the movable wall portion of the head is separated only slightly from the stationary wall portion of the head, with the result that the draining process is slowed to an extent that prevents splashing of the liquid over the sides of the machine.

The lower rollers in the quenching chamber, some of which are power driven, are mounted on brackets that are adjustable horizontally on ways extending along the chamber in the direction of the roller axes. Similarly the upper rollers are carried by brackets that are adjustable horizontally along the pressure head, in the direction of the roller axes, and also vertically of the pressure head. The upper rollers are preferably journaled in plungers that can slide vertically in the brackets and are urged downwardly by springs that are compressed between the brackets and the plungers. A means is provided to adjust the downward limit position of each plunger, this in effect being an adjustment of the initial loading of the spring associated with the plunger. By this adjustment in combination with the vertical adjustment of the brackets on the pressure head, the upper rollers may be caused to bear upon the work with whatever pressure is desired.

The system for supplying quenching liquid includes an inlet channel to the quench chamber extending substantially the full width of the latter in the direction of the axes of the rollers. A valve means is provided to adjust the rate of fluid flow to this channel, and other valve means are provided to adjust the relative rates of flow from the channel into the quenching chamber in different regions along the width thereof. These valve adjustments enable the machine to be set up to quench work pieces of greatly varying sizes, requiring different rates of quenching fluid flow, and also to provide for different rates of flow over different portions of a work piece which, for example, may be of heavy cross-section at one end and of small cross-section at its opposite end.

One method of quenching in the machine a heated work piece of elongated substantially cylindrical shape, comprises bowing the longitudinal axis of the work piece, rotating the work piece about such bowed axis, and applying a quenching medium to it while it is being so rotated about such bowed axis. This method has been found to result in work pieces superior in straightness to those quenched while held perfectly straight. The work is held with its axis so bowed by the quenching chamber rollers which engage it at spaced points about its circumference and along its length, the rotation of the work being accomplished by rolling it upon these rollers while the axes of the latter remain substantially stationary.

According to a further aspect of the invention the machine is provided with testing and separating means which act to test the quenched work for straightness and to separate the acceptable work from the unacceptable. To this end the machine has a test station comprising lower rollers for supporting the work, and upper rollers mounted on a supporting means, preferably in the form of a pressure head pivoted to the machine base, that is adapted to lower them into and raise them from operative relation with the lower rollers. A mechanism is provided to transfer work from the lower rollers in the quench chamber to the lower rollers of the test station, this mechanism being operated in timed relation with raising and lowering of the quench chamber pressure head and the test station pressure head.

The transfer mechanism is arranged to eject work from the test station lower rollers prior to transferring other work to them from the quench chamber, and there is a selector means which causes the ejection to be in different paths for acceptable work and for unacceptable work. Operation of the selector means is controlled by testing means, preferably in the form of electrical switches located beneath the work being rotated on the testing station rollers. One or more of these switches is closed by any rotating work piece that has excessive radial runout or eccentricity, indicating that it is not straight enough for its intended purpose.

The selector mechanism comprises a drive member oscillated by a part of the work transfer mechanism and a member that is moved by said drive member when and only when a solenoid that is actuated by the testing switch means is energized, the driven member then moving certain selector guide bars whose position determines the path of the ejected work. A pawl is pivotal on one of the drive and driven members between limit positions wherein it is respectively engageable and unengageable with an abutment on the other member. Upon being energized the solenoid effects movement of the pawl to its engageable position so that a drive is effected between the members. The pawl is subsequently shifted to its unengageable position by return motion of the driven member during which another abutment engages the pawl. Shifting of the pawl to such unengageable position is accomplished by making the return travel of the drive member greater than the limited return motion of the driven member. Resilient detent means is provided to retain the pawl in either of its limit positions until it is positively moved to the other position. Preferably both the drive and driven members are arranged for swinging motion about a common center.

The work transfer mechanism comprises one or more work carriers and a pair of arms pivoted to each carrier on spaced centers, the arms being swingable about other spaced centers. One arm is carried by a crank so that the center about which it swings can be moved. Means are provided to swing the other arm to effect substantially translatory motion of the carrier between the quenching chamber lower rollers and the test station lower rollers, and to turn the crank to tilt the carrier for ejecting work at the test station and for engaging under work in the quenching chamber. Rotating with the cranks which lower and raise the quench chamber pressure head is a cam which has two continuous cam tracks. One of these tracks operates the means for swinging said other arm while the second track operates the crank. By this arrangement the transfer mechanism is mechanically connected for operation in timed relationship with the quenching cycle of the machine.

The foregoing and other objects and advantages will become apparent from the following description made with reference to the drawings, wherein:

Fig. 1 is a plan view of the machine with the quenching chamber pressure head removed and certain other parts broken away and appearing in section;

Fig. 2 is a fragmentary elevation of the right side of the machine;

Fig. 8 is a view approximately in the plane 8—8 of Fig. 1 showing the unloader mechanism and the associated test station parts;

Figures 12, 13:
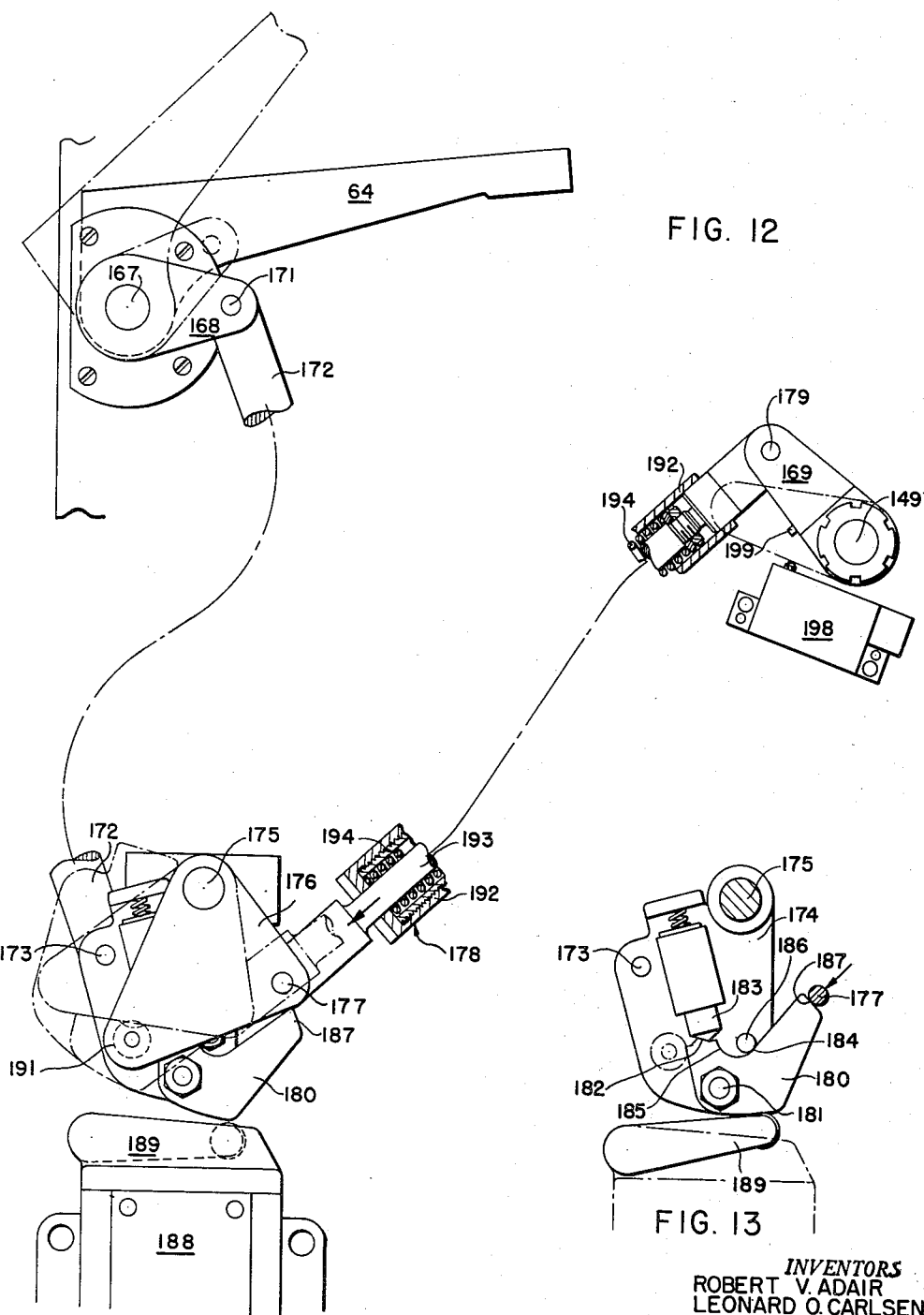
Figure 16:
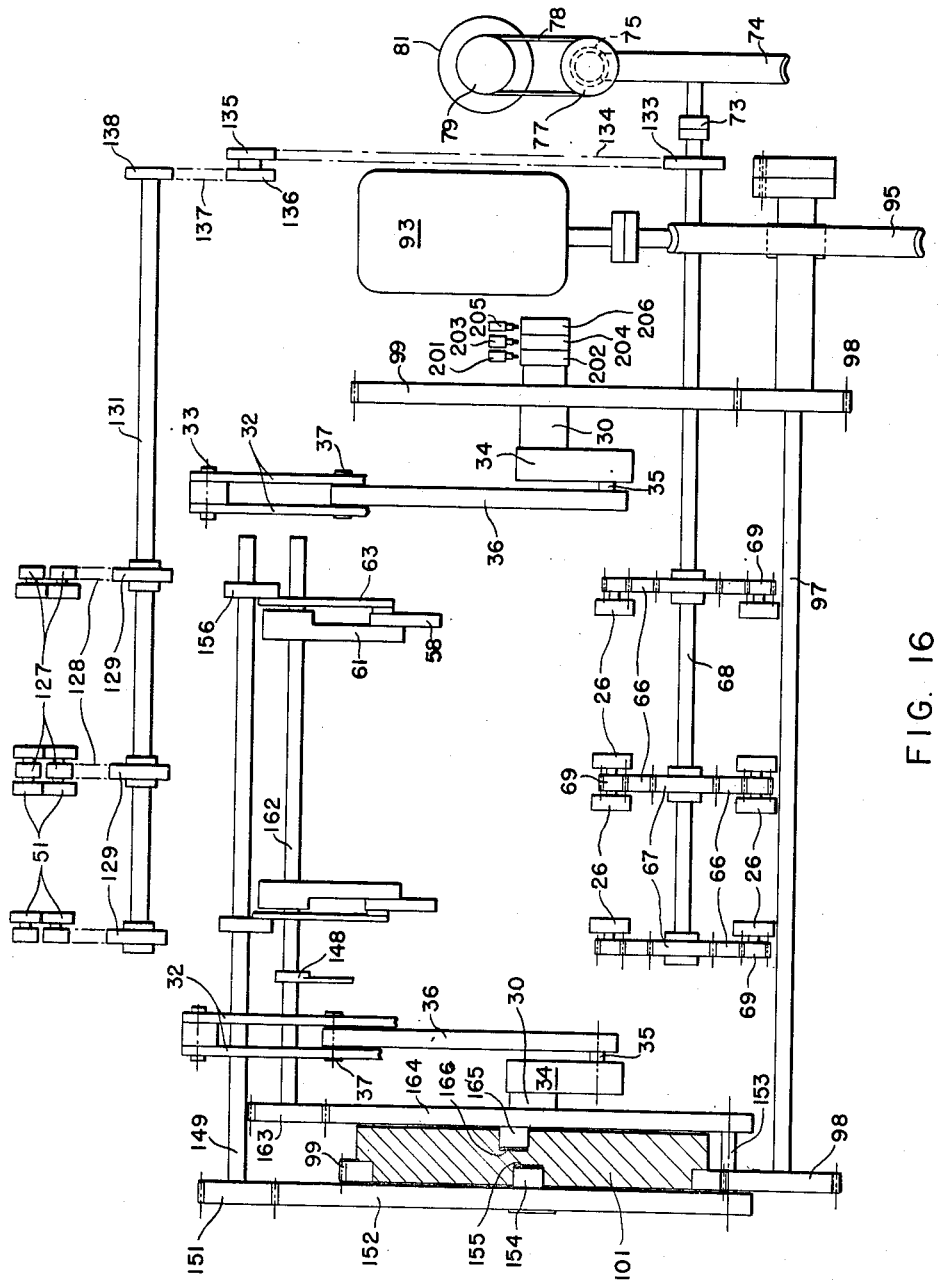

Figs. 9 to 11 inclusive are views similar to Fig. 8 but on a smaller scale, showing the unloader mechanism in various phases of its operating cycle;

Fig. 12 is a foreshortened elevational view of the selector bar operating mechanism, taken in the plane 12—12 of Fig. 1;

Fig. 13 is a detail view of a clutch part shown in Fig. 12;

Fig. 14 is a detail view taken in the plane 14—14 of Fig. 1, showing one of the work eccentricity testing switches;

Fig. 15 is a chart showing the sequence of movements of various cams and other operating parts of the machine;

Figs. 16 and 17 are respectively a mechanical drive diagram and an electrical wiring diagram of the machine; and, Figs. 18 and 19 are respectively diagrammatic front and sectional views of a work piece supported between the quenching chamber rollers, Fig. 19 being in the plane indicated at 19—19 in Fig. 18.

Figure 3:
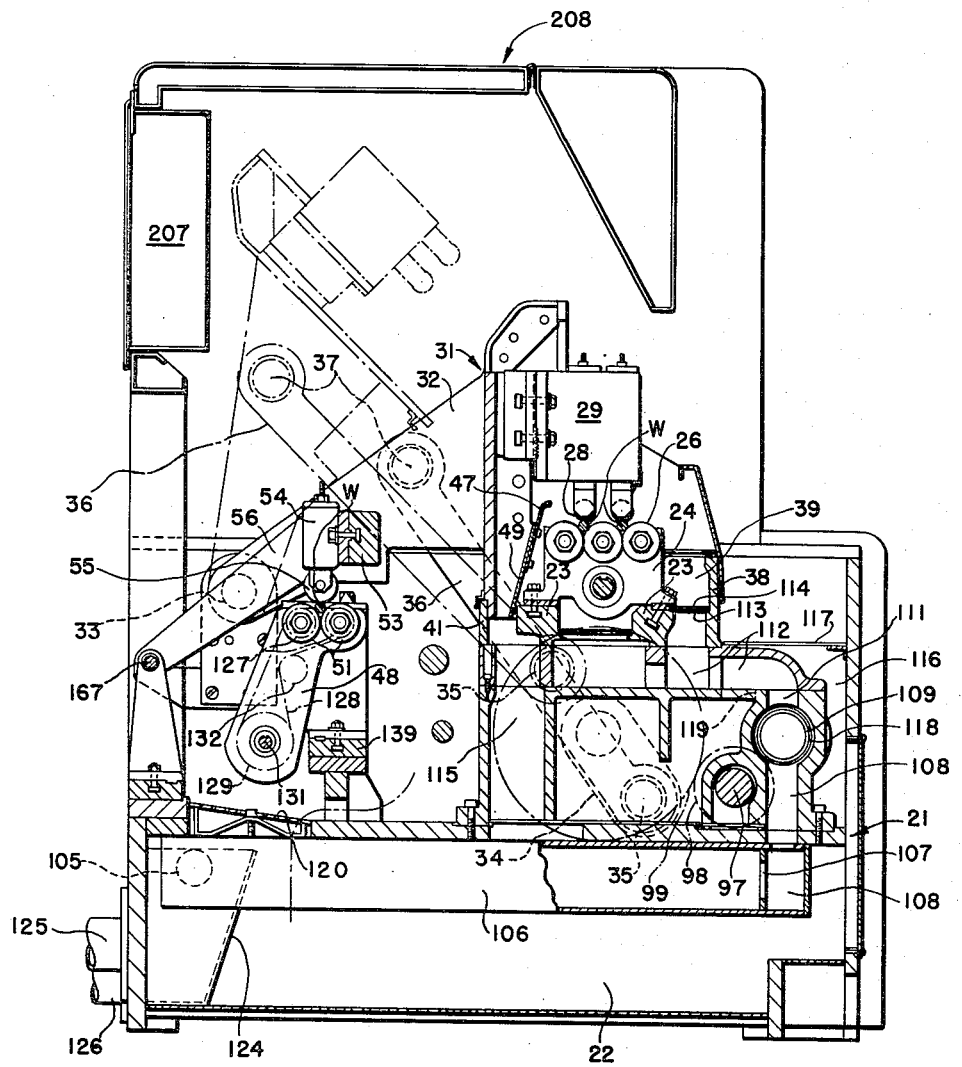
Fig. 3 is a longitudinal sectional view taken in various vertical planes including plane 3—3 of Fig. 1 and planes parallel thereto.
Figure 4:
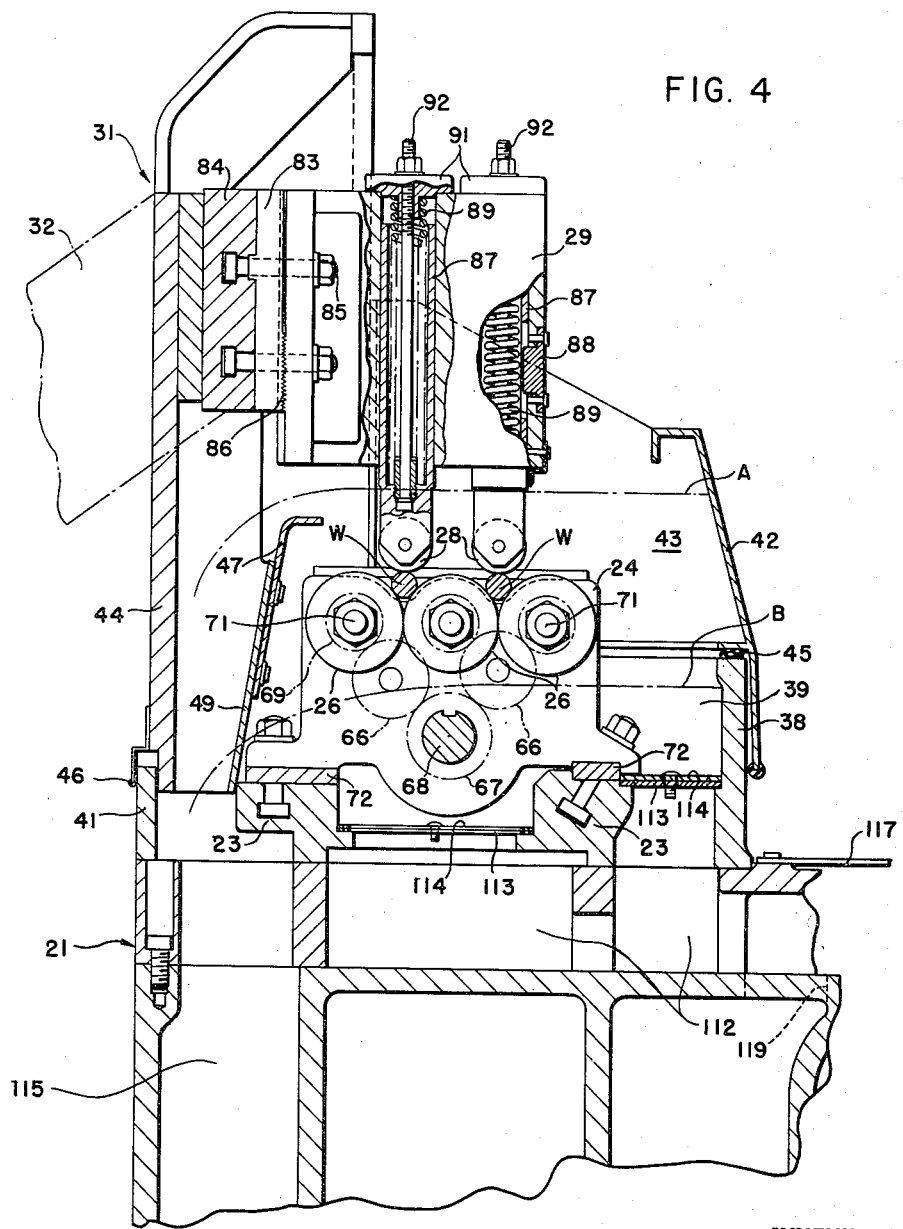
Fig. 4 is a fragmentary longitudinal sectional view on a larger scale than Fig. 3 showing the structure in and adjacent the quenching chamber.

Referring to Figs. 1, 3 and 4, the machine comprises a base 21 having a sump 22 for quenching liquid. On the base are ways 23 supporting drive roller brackets 24 and idler roller brackets 25, these brackets respectively journaling drive rollers 26 and idler rollers 27 on which work pieces W are rolled while being quenched. The work pieces are held upon the rollers 26 and 27 by clamping rollers 28 journaled in brackets 29. The latter are carried by a pressure head 31 that has bifurcated arms 32 connected by pivot pins 33 to parts of the base 21 to permit the head to swing between the lowered position shown in full lines in Fig. 3 and the elevated position there shown in broken lines. In the lowered position the work is clamped against the rollers 26 and 27 by upper rollers 28, while in the elevated position of the head the upper rollers are raised to permit removal of quenched work pieces and placement of others that have been heated and are ready for quenching. The head 31 is raised and lowered by rotating cranks 34, one of which is near each end of the machine. Each crank has its shaft 30 journaled in the frame of the machine and its crank pin 35 connected by a pitman 36 to a pivot pin 37 extending between the opposed parts of bifurcated arm 32.

The quenching chamber has lower front wall 38, lower side walls 39 and lower rear wall 41, these parts being stationary with the machine base; and upper front, side and rear wall portions 42, 43 and 44 which are parts of the pressure head 31 and are movable therewith. Front and rear sealing strips 45 and 46 maintain a substantially liquid-tight relation between the upper and lower walls when the head is lowered. Quenching liquid is elevated into the chamber by a motor operated pump. When the head 31 is lowered the parts 42, 43 and 44, together with a baffle plate 47 carried by the head, constitute a dam which maintains the liquid at a level, indicated approximately at A, sufficient to immerse the work pieces supported on rollers 26, 27. Excess liquid spills over the baffle 47 and returns to the sump 22. When the head 31 is elevated the dam is thereby removed, and the liquid spills over wall 38 and rear way 23 and returns to the sump, lowering the level to approximately that indicated at B, well below the work pieces. Thereafter while the head 31 remains elevated the liquid level B is maintained by overflow of the rear way 23 which at this time constitutes the rear wall of the quench chamber.

Back of the quenching chamber (to the left thereof in Fig. 3) is the testing and selector station. Here are located brackets 48 journaling drive rollers 51 on which the work is rotated, and while so rotated is tested for straightness by means to be described hereafter. A pressure head 53 supports brackets 54 carrying pressure rollers 55 whose function is to clamp a work piece against the lower rollers 51. The pressure head has arms 56 pivoted by sleeves 57 (Fig. 7), to sleeve supporting brackets on the machine base, to enable the head to be raised from the position shown in full lines in Fig. 8 to the position there shown in broken lines to release the work for removal from the rollers 51.

Referring to Figs. 1 and 8, the work is transferred from the quenching chamber rollers 26, 27 to the test station rollers 51 on carriers 58 each of which is pivoted at 59 to an actuating arm 61 and at 62 to a guide arm 63. After the two rear work pieces W are tested while rotating on rollers 51, the arms 61, 63 move the carrier to eject them and shift the two other pieces onto the rollers. Each ejected piece, if accepted by the testing means, rolls down a selector bar 64 to a suitable receptacle (not shown). If it is not acceptable, the selector bar 64 is raised, to the position shown in broken lines in Fig. 8, and the work piece rolls down stationary guide bars 65 to another receptacle (not shown) for rejected pieces.

The holding of the work piece axis bowed during the quenching operation is shown diagrammatically in Figs. 18 and 19. There the upper set of quench chamber rollers 28, whose support is the pressure head 31, are of varying diameters at different points along the length of the work piece W, as are the two parallel sets of lower rollers 26, 27, whose support comprises the brackets 24, 25. When the upper and lower supports have been moved together, to clamp the work W between the three sets of rollers, the work piece longitudinal axis Wa is bowed relative to the straight axis 28a of the upper set of rollers and the two straight axes 26, 27a of the lower rollers. Rotating the heated work piece, through power drive rollers 26, about bowed axis Wa, while the quenching medium is applied to cool them, has been found to produce work pieces that are much straighter than those held with axis Wa straight during quenching.

The amount of bow of axis Wa is exaggerated in Fig. 18 to illustrate the principle. The optimum amount of bowing is determined experimentally, and depends upon the composition of the work pieces and their physical dimensions. It will be understood that while the axes 28a and 26, 27a are shown as straight in Fig. 18 and the rollers 26, 27, 28 as varying in diameter at different points along the length of the work piece, the same result is obtained by employing rollers that are of the same diameter at said different points, and adjusting them vertically to different relative heights at said different points to thereby achieve the bowing of axis Wa.

The machine and method having been generally described, the several main components of the machine will now be described in detail.

*Quenching chamber pressure rollers and drive therefor*

With reference to Figs. 1 and 4, the ways 23 have T-slots extending lengthwise thereof for bolts which secure the drive roller brackets 24 and the idler roller brackets 25 in any desired positions of adjustment along the ways, these positions depending upon the length of the work pieces. In the case illustrated the brackets 24 and 25 are set up for four work pieces, two of them side-by-side and two end-to-end. However, the location of the brackets along the ways 23 may be changed, or brackets may be removed or additional ones provided, as may be required to accommodate work pieces of other lengths within the capacity of the machine. For example for very long work pieces the central drive bracket 24 might be removed and replaced by one or more idler roller brackets. The idler and drive roller brackets are of similar construction except that the latter contains gearing for driving the rollers 26 whereas the brackets 25 contain no means to drive rollers 27. As shown in Fig. 4 each drive bracket contains intermediate gears 66 both of which mesh with a drive gear 67 that is keyed to a drive shaft 68 journaled in the brackets 24. One intermediate gear 66 drives a pinion 69 affixed to stub shaft 71 of the rear roller 26 while the other intermediate gear drives the pinions 69 of the front and middle rollers 26. The shaft 68 passes through an opening in, and does not touch, the idler brackets 25. As shown in Fig. 4, shims 72 are inserted between the ways 23 and the brackets 24, 25. By means of the shims the brackets 24 are all adjusted to the same height so that the drive shaft 68 is straight, while the brackets 25 are adjusted to the relative heights necessary to achieve optimum work straightening effect. If the effective height of rollers 26 must be changed for the latter purpose, the change can be effected by substituting rollers 26 of different diameter. The height adjustment may be such that the work piece will be held perfectly straight while being quenched; or, preferably, the work piece is bowed slightly from end to end. The roller drive shaft 68 is driven through a flexible coupling 73 (Fig. 16) by a worm wheel 74 which together with its mate worm 75 is contained in a housing 76 at the right end of the machine. To the worm shaft is keyed a pulley cluster 77 (Figs. 1 and 2) that is connected by an endless belt 78 to pulley cluster 79 of drive motor 81. The latter is pivoted to the housing 76 and may be adjusted relative thereto by a turn buckle 82 to adjust the tension of belt 78. By shifting the belt 78 to higher or lower pulleys of clusters 77 and 79 the speed of the driver rollers 26 may be varied.

The pressure roller brackets 29 are held upon plates 83 (Fig. 4), and the latter upon member 84 of the pressure head 31, by means of bolts 85. The plate 83 has a tongue and groove connection with member 84 and is adjustable along the groove to position the rollers 28 in the desired relation above rollers 26 and 27. The brackets 29 and plates 83 have mating clutch teeth 86 which hold them positively in whatever position of vertical adjustment is suitable for work pieces W of any given diameter.

Each roller 28 is journaled in a plunger 87 that is slidable in a vertical bore in the bracket 29. The plungers are prevented from turning by having keyways engaged by keys 88 on the brackets. Compression springs 89 within the plungers urge the latter downwardly, the spring reacting against caps 91 which are secured to the bracket by suitable screws, not shown. Threaded rods 92 are anchored at their lower ends to the plungers and have nuts bearing upon the tops of the caps. By turning these nuts the springs 89 may be compressed to vary the clamping pressure which the rollers 28 exert on the work pieces. The bracket 29 may be adjusted vertically, as described hereinbefore, so that when the head 31 is lowered the nuts on the rods 92 will be slightly raised off the caps 91.

The rotation of the cranks 34 to effect raising and lowering of the head is effected by a main drive motor 93 (Fig. 2 and 16) through a worm 94 and worm wheel 95 located in a drive bracket 96 at the right end of the machine, a main drive shaft 97 on which the wheel 95 is mounted, and pinions 98 meshing with gears 99 on the crank shafts. The left gear 99 is a ring gear mounted on a cam 101 affixed to the left crank shaft 30.

The springs 89 are readily replaceable, and either heavy or light springs may be employed, depending upon the force required on the rollers 28. In fact it has been found desirable in quenching some kinds of workpieces to substitute non-yieldable tubular parts for the springs 89, so that the rollers 28 will have no vertical motion whatever relative to brackets 29. In this case the axes of rollers 28, 26 and 27 are in relatively fixed relationship when the head 31 is lowered.

*The quenching liquid system*

The baffle member 47 is vertically adjustable, by means of a slot and bolt connection, upon a lower section 49 that is a fixed part of the head 31, and by this adjustment the level A of liquid in the quenching chamber may be varied as desired. The liquid is drawn from sump 22 into a high capacity pump 102 (Fig. 2) through a conduit 103. The pump, driven by electric motor 104 discharges through a conduit 105 extending along the back of the sump and opening into a transverse conduit 106. The latter has a restriction 107, designed to maintain the discharge head desired at the pump, and opens into a vertical channel 108 in the front portion of the machine base. From the latter the liquid passes through a line of ports 111 spaced along the frame, into a chamber 112 which also extends along the front of the machine above ports 111. Then it passes upwardly into the quenching chamber through apertured plates 113, 114, which are disposed between front wall 38 and front way 23, and between the two ways 23. From the quenching chamber the liquid may return to the sump by way of vertical channel 115 when the pressure head 31 is lowered and after it has been raised, and by way of channels 115 and 116 while the head is being raised and there is some overflow of front wall 38. An apertured drain plate 117 is provided above channel 116 to prevent work pieces or other parts from dropping into the channel. Any liquid that spills over quenching chamber lower rear wall 41 returns to the sump through a screen 120 (Fig. 3) in the floor of the testing station.

Figure 5:
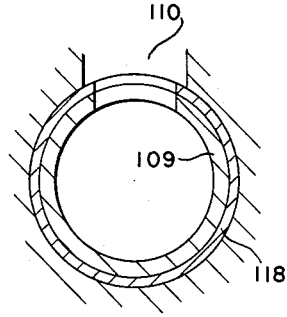
Fig. 5 and 6 are detail longitudinal and transverse sections through the quenching chamber liquid inlet valve.
Figure 6:
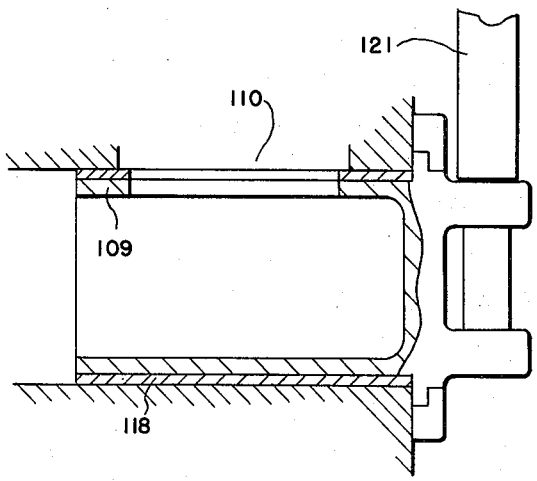

For controlling the quantity of liquid delivered to chamber 112 there is provided a tubular valve 109 rotatable in a bearing sleeve 118 that is fixed to the machine frame. As best shown in Figs. 3, 5 and 6 the sleeve has a port aligned with an opening 110 that communicates with a return port 119. A wall portion 130 separates the chamber between ports 110 and 119 from the adjacent chamber 112. By means of a handle 121 (Figs. 1 and 6) on the right end of the valve, the latter may be rotated to a position wherein the port 110 is closed so that all liquid discharged by pump 102 is directed into the quenching chamber, or the valve may be rotated to other positions wherein part of all of such discharge may escape through the valve 109 and ports 110 and 119 to the sump 22. In this way the volume of quenching fluid entering the quenching chamber may be adjusted as desired.

The two upper apertured plates 113 extend the full length of the quenching chamber, while there are a plurality of shorter apertured plates 114 secured to the upper plates by screw and slot connections 122. By varying the positions of the lower plates on the mating upper plate the degree of registry of their apertures may be varied. Thus the plates constitute valves by means of which the rate of liquid flow may be varied at different points along the width of the chamber. For example, a greater rate of flow may be obtained at a point where the work piece is of greater diameter and hence requires a greater flow for proper quenching. The plates 113 and 114 are readily replaced by other plates having their apertures located especially for work pieces of a given design.

The machine is adapted for connection to an external source of quenching fluid, such source (not shown) preferably including cooling means. A pipe 123 (Fig. 1) may continuously carry cool quenching liquid from the source into one end of the sump 22 and maintain the sump filled to a level controlled by baffle 124 (Fig. 3). Liquid overflowing this baffle may return to the source through a pipe 125. For draining the sump 22 a pipe 126 containing a shut-off valve extends from the bottom of the sump to the source.

*The unloading and testing mechanism*

With reference to Figs. 1, 3 and 16, the shafts of test station drive rollers 51 have affixed thereto sprockets 127 over which run endless drive chains 128, the latter also running over drive sprockets 129 carried on a drive shaft 131 and over idler sprockets 132. The sprockets 127, 129 and 132 and the chains 128 are housed within the stationary drive brackets 48. Shaft 131 is driven by motor 81 through a drive train including a sprocket 133 on shaft 68, endless chain 134, sprockets 135 and 136, endless chain 137 and sprocket 138 on shaft 131. The brackets 48 are adjustable along a way 139, which is a stationary part of the machine base, to thereby so position the rollers 127 that the ends of the work pieces W rest on them. To accommodate such adjustment of the brackets the sprockets 129 are adjustable along the shaft 131.

The test station pressure rollers 55 are journaled in plungers 141 (Fig. 7) which are mounted in brackets 54 under an adjustable spring loading, similarly to the mounting of plungers 87 in brackets 29. Also the brackets 54 are adjustable vertically and horizontally along pressure head 53 similarly to the adjustability of brackets 29 on pressure head member 84. This enables the rollers 55 to engage a work piece W directly over the drive rollers 51 with pressure sufficient to effect drive of the work by the rollers 51. As shown, the carriers 58 (Fig. 8) are notched to support two work pieces in side-by-side relationship. They also each have a finger 142 engageable with a shoe 143 on the pressure head 53, to raise the latter for a purpose hereinafter described.

Figure 7:
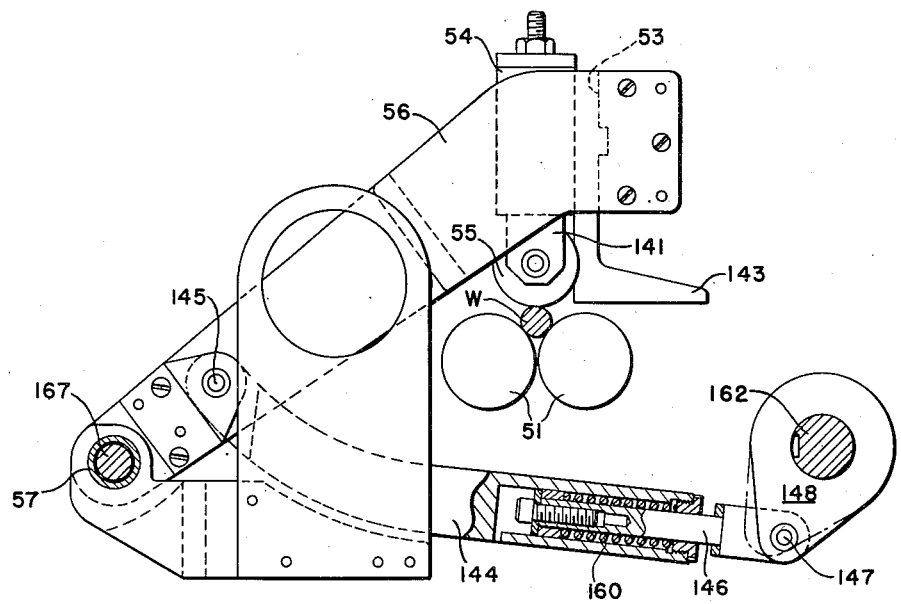
Fig. 7 is a vew approximately in the plane 7—7 of Fig. 1 showing the operating crank and connecting link for operating the test station pressure head.

As best shown in Fig. 7 the assembly comprising arms 56 and head 53 is operated by a means comprising a two-part link of which one part, 144, is pivoted to one arm 56 by a pivot pin 145. The other part, 146, telescopes in the first part and is pivoted to pin 147 of a crank 148 that is keyed to a shaft 162. The latter extends across the machine and has affixed to its left end a pinion 163 (Figs. 8 and 16) that meshes with a gear segment 164 mounted on a stub shaft 153 (Fig. 1) on the machine base. The segment carries a roller 165 engaged in a cam track 166 in the inner face of the cam 101. In Fig. 8 the line designated 166 represents the median line of the cam track, i. e. the line which is followed by the center of roller 165. As the cam rotates, the shaft 162 is oscillated intermittently, as determined by the shape of the track 166. Upon motion of the crank 148 between the full and broken line positions shown in Fig. 7 the part 146 telescopes idly in part 144, without moving the arm 56. However movement of the crank 148 clockwise beyond the broken line position will cause the shoulder on part 146 to abut part 144 and swing arm 56 counterclockwise about bushing 57, thereby raising the pressure head 53 and rollers 55. When the head 53 is raised by fingers 142 and shoes 143 the telescoping connection 144, 146 prevents the motion from being transmitted to shaft 162. A spring 160 compressed between parts 144 and 146 yields to permit the telescoping action just referred to but acts to overcome the inertia of the head 53 and cause the latter to move from its raised position to its lowered position in unison with return motion of crank 148.

With reference to Figs. 1 and 8 the shaft 149 has cranks 156 whose pins 157 are connected by adjustable length links 158 to pins 159 of cranks 161. The latter are rotatably supported on the shaft 162 to which the actuating arms 61 and cranks 148 are affixed. Also pivoted by pins 159 of cranks 161 are the guide arms 63. The shaft 149 carries at its left end a pinion 151 (Fig. 16) mating with a gear segment 152, which, like segment 164, is rotatable on stub shaft 153. Segment 152 carries a roller 154 engaging in a cam track 155 on the outer face of cam 101. In Fig. 8 the line designated 155 is the median line of the cam track, the line followed by the center of roller 154.

Upon rotation of the cam 101 and the resultant intermittent turning of the shaft 162 the loader actuating arms 61 are swung to the various positions shown in Figs. 8 to 11, inclusive, the motion being determined by the shape of the cam track 166. During such motion of the arms 61 so long as the pins 159 of cranks 161 remain stationary the members 61, 161, 63, and 58 constitutes a parallelogram assembly, so that the motion of the carrier 58 is translatory. However when the shaft 149 is turned the pin 159 is shifted to modify the parallelogram action in a manner that will be described in detail hereinafter.

The selector bars 64 are carried by two rotatable shafts 167 journaled end to end in brackets on the frame and extending concentrically within, but not touching, the bearing sleeve 57. One shaft 167 carries two selector bars for the work pieces at the right side of the machine, while the other shaft 167 carries two bars for work pieces at the left side. The operating mechanism for the two shafts 167 is duplicated at the opposite sides of the machine. This mechanism appears in Figs. 1 and 2, and is shown in detail in the larger scale foreshortened view Fig. 12. It includes a crank arm 168 on each shaft 167 and another crank arm 169 on shaft 149. Arm 168 is pivoted at 171 to connecting rod 172 which in turn is pivoted at 173 to a clutch part 174 (see also Fig. 13) which is pivoted to the frame by stationary pin 175. Also pivoted on pin 175 is another clutch part 176 which is pivoted at 177 to the lower end of a connecting link 178 whose upper end is pivoted at 179 to crank arm 169. At times the clutch parts 174, 176 are connected to move in unison, so that turning motion of shaft 149 is effective, through crank 169, link 178, the clutch parts (pivoting about pin 175) and rod 172, to turn crank 168, shaft 167 and selector bars 64. At other times the clutch parts are disconnected from each other with the result that no motion is transmitted from shaft 149 to shaft 167 and bars 64.

The part 174 has a pawl 180 pivoted thereto by a pin 181. One end of the pawl has a detent 182 engaged by a spring pressed plunger 183 that is also carried by the part 174. The function of this resilient detent means is to hold the pawl 180 in either one of two limit positions upon the part 174. In the position shown in Fig. 13 the plunger engages the right surface of detent 182 and holds point 184 of the surface of the pawl against a stop 186 on member 174. In the position, the plunger engages the left surface of detent 182 and hold points 185 on the surface of the pawl against the stop. In the position shown in Fig. 13 the end 187 of the pawl is in the path of pin 177, which constitutes an abutment on clutch part 176, so that as the link 178 moves in the direction of the arrow in Figs. 2, 12 and 13 the parts 174 and 176 will be moved in unison to turn shaft 167 in a direction to raise selector bars 64. When the pawl is in the other position (shown in full lines in Fig. 12), its end 187 is below the path of pin 77, so that motion of the link 178 in the direction of the arrow will not effect motion of the clutch part 174.

The pawl is shifted to the position shown in full lines in Fig. 13 by energization of a solenoid 188 with resulting raising of its armature actuated lever 189. After deenergization of the solenoid, with the resulting lowering of lever 189, the pawl is swung to its other position (shown in Fig. 12) by an abutment roller 191 on clutch part 176 during the following return motion (counterclockwise) of clutch part 176. During such return motion the parts 174 and 176 move in unison until the selector bars 64 reach their lowermost positions and prevent any further motion of clutch part 174. During continued counterclockwise motion of clutch part 176 the roller 191 engages pawl 180 and shifts it to the position thereon shown in Fig. 12. The lever 169 is designed to impart to clutch part 176 a return motion of greater amplitude than that of clutch part 174, the latter being limited by the seating of bars 64 in their lowermost position. However to permit such overtravel of crank arm 169 at a time when the solenoid lever 189 is raised so that the pawl 180 is in the path of pin 177, the link 178 is made to comprise two spring-connected parts. One of these is tubular part 192 connected to pin 179 and the other is rod 193 connected to pin 177. A coil spring 194 compressed between the lower end of the tubular part 192 and the upper end of the rod 193, enable the link 178 to extend during return motion of crank 169 when the pawl is in its engaging position.

*The electrical system*

The solenoids 188 for controlling the selector bars on the two sides of the machine are controlled by limit switches 195. These switches are mounted on the test station way 139 (Figs. 1 and 14), and have vertically movable spring backed actuating plungers 196 engageable with the work pieces. The switches may be adjusted along the way to engage the work pieces at suitable points along their lengths intermediate the drive rollers 51, and the plungers 196 are adjustable vertically to accommodate work pieces of various diameters and to determine the amount of plunger axial motion necessary to actuate the switches to closed position. Flexible cables 197 extending from the switch housings contain electric leads which are connected in circuit with the solenoids in the manner shown in Fig. 17. When a work piece that is defective by being bowed or warped from end to end is rotated on rollers 127, the excessive eccentricity or radial runout present in it at the point along its length adjacent a switch plunger 196 will result in the latter being moved downwardly. This will close the switch 195 with the result that the related solenoid 188 will be energized. In the particular machine set-up illustrated, three switches 195 are arranged at approximately equal intervals along the length of the right work piece W at the test station, while two such switches are arranged at approximately equal intervals along the length of the left work piece at the test station. For further conrolling the two solenoids 188 a normally open limit switch 198 (Fig. 12) is provided. The actuating plunger of this switch is moved to switch opening position, by an adjustable screw 199 on one of the two lever arms 169 when these arms swing to their lowermost position.

The electrical system of the machine further includes a drain limit switch 201 (Figs. 16 and 17) operated by a cam 202, a quench limit switch 203 operated by a cam 204, and a cycle end stop limit switch 205 operated by a cam 206, the three cams mounted on the shaft of the right crank 34. Other parts of the system are mounted in a chamber 207 formed in the sheet metal housing structure 208 of the machine. These parts include a controller 209 for pump motor 104, a controller 211 for roll drive motor 81, a controller 212 for main drive motor 93, a holding relay 213, a drain time relay 214, a quench time relay 215, and solenoid control relays 216R and 216L respectively for the right and left solenoids 188 (designated 188R and 188L in Fig. 17). Each of the relays 214 and 215 preferably is of a type which upon energization of its windings immediately opens its contacts and then, after a predetermined time delay, which is adjustable, closes them and retains them closed until a subsequent energization of its winding. Preferably located on the left front panel 218 of housing 208 are start and stop push button switches, 221 and 222 respectively, for the motor 104, and similar start and stop push button switches, 223 and 224 respectively, for the motor 81. Widely spaced apart on the right front panel of the housing (corresponding to panel 218 on the left side of the housing) are quench cycle push button start switches 225, the spacing requiring the operator to use both hands to start the cycle. Also on the right front panel is a quench cycle stop switch 226.

*Operation—quenching cycle*

Assuming the machine to be properly set up for quenching the four work pieces W at one time, its operation may proceed in the manner which will now be described with especial reference to the wiring diagram, Fig. 17, and to the cycle diagram, Fig. 15, in which is shown, in timed relation to the rotation of cranks 34, the motions effected by switch cams 202, 204 and 206, and the motions effected by cam 101, these including the motions of the unloader arms 61 (on shaft 162), and cranks 156 and 169 (on shaft 149). The motion of cranks 34 is shown in degrees at the bottom of Fig. 15. At the beginning of a cycle the cranks 34 are in their 0° or 360° position, this being the broken line position of Fig. 3, wherein the quench chamber pressure head 31 is fully elevated. The operator presses start buttons 221 and 223, thereby energizing circuits from electric main lead 227 of a three-wire current supply system through the respective controls of stop switches 222 and 224 and the windings of controllers 209 and 211 to return main lead 228. This immediately results in closing of the movable contacts of the controllers so that the motors are connected to the leads 227, 228 and 229 of the current supply system, with the result that the quenching liquid pump 102 and the drive rollers 69 and 127 are put in operation. They will continue to operate until the stop switch buttons 222 and 224 are pressed, because closure of the right movable contacts of the controllers 209 and 211 establishes holding circuits around the switches 221 and 223, so that opening of the latter upon release of manual pressure on them has no effect. As before explained flow of quenching liquid over rear way 23 of the quench chamber will maintain the level approximately as indicated at B (Fig. 4).

The operator now places four heated work pieces W ready for quenching on the rollers 26 and 27, and presses the two start switch buttons 225. This establishes a circuit from lead 227 through now closed stop switch 226, switches 225, lead 233, now closed switches 203 and 201, lead 234 and the winding of controller 212 to lead 228. As a result the motor 93 operates to lower pressure head 31. As the latter approaches its lowered position (the 180° position of the cranks) the pressure rollers 28 clamp the work pieces W to the now rotating drive rollers 26, and the dam 42, 43, 47 is emplaced so that the quenching liquid level begins to rise from level B to level A, immersing and quenching the rotating work. During this part of the cycle the liquid flows continuously over the work and then returns to the sump by overflowing baffle 47.

As soon as the cranks 34 have rotated far enough for drop 231 of cam 206 to become effective, the switch 205 is closed by the cam, thereby establishing for relay 213 a holding circuit that shunts the switches 225. Therefore release by the operator will now have no effect upon continuation of the operating cycle. Shortly after closing of switch 205, rise 232 of cam 204 operates switch 203 to open the latter's upper contacts and close its lower contacts. This switch operation de-energizes the controller 212 so that motor 93 stops, but a circuit is established through the winding of relay 215 in lead 235 and return to lead 228. The contacts of relay 215 are immediately opened, and, after the predetermined time delay for which this relay is adjusted, are closed, thereby establishing a shunt 236, 237 around the switch 203. This re-energizes the controller 212 and restarts motor 93. However the motor has remained stopped long enough for the quenching operation to be completed.

Shortly later in the cycle a drop 238 in cam 204 again reverses switch 203, opening its lower contacts to open the shunt circuit 236, 237 and simultaneously reclosing its upper contacts so that operation of motor 93 is not interrupted. The cranks 34 are now raising the pressure head 31, and as soon as this has progressed far enough to allow substantial escape of quenching liquid beneath seal 45 and baffle 47, 49, the rise 239 of cam 202 reverses switch 201, opening its upper contacts and closing its lower contacts. This opens the circuit through the winding of controller 212 and stops the motor 93, while at the same time energizing drain time relay 214 with the result that its contacts are immediately opened. After a time delay long enough to permit the fluid level in the quenching chamber to drop approximately to level B, the contacts of relay 214 close, thereby establishing a shunt via leads 241 and 242 around the now open upper contacts of relay 201. This re-energizes the controller 212 and restarts motor 93 which continues to operate until the end of the cycle when the pressure head 31 is fully elevated. At this time rise 343 of cam 206 opens switch 205 thereby de-energizing holding relay 213, whose contacts open as a result, and also de-energizing the controller 212 so that motor 93 stops. A new cycle can be commenced only by reclosing switches 225.

*Operation—unloading and testing cycle*

Simultaneously with the quenching cycle the unloading and testing cycle is also occurring. At the start of the cycle the unloader arms 61 and the cranks 156 are in the positions shown in full lines in Fig. 8. It will be assumed for this part of the description that the machine has operated through a preceding complete cycle so that two work pieces W are supported on rollers 51 while two other work pieces W rest in the forward notches of carriers 58. The test pressure head 53 is lowered and rollers 51 are rotating the work pieces W supported on them. If the work pieces W on the rollers 51 run true within the limits for which the machine is adjusted, then the limit switches 195 remain open and the windings of relays 216 accordingly are de-energized, as are also the solenoids 188. However if there is excessive eccentricity or radial runout of the work pieces one or more of the switches 195 will be closed. Closure of either one of switches 195L will cause the relay 216L to be energized by a circuit from lead 227 to lead 228 via now closed switch 198, the closed switch 195L and lead 244. Closing of the left contact of relay 216L establishes a holding circuit for the relay via lead 245, so that as the eccentric work piece rotates the relay contacts will remain closed even though the closed switch 195L may repeatedly open. Closing of the right contact of relay 195L energizes solenoid 188L by a circuit from lead 227 through lead 246, the windings of 188L and lead 244 to lead 228, so that the lever 189 of the left solenoid will be raised. Similarly the closing of either of limit switches 195R will indicate excessive eccentricity of the right work piece W on rollers 51 by operating relay 216R and solenoid 188R to cause the lever 189 of the right solenoid to raise.

At point 247 (Fig. 15) a rise of track 155 of cam 101 causes shaft 149 to begin to turn, swinging cranks 156 and 169 downwardly. At point 245 the unloader arms 61 also begin to swing downwardly, this being effected by a rise of track 166 of cam 101. At point 248 in the cycle the arms 61 and 63 are in the position shown in full lines in Fig. 9, wherein the carrier has lifted the rearmost work pieces off rollers 51, the pressure head 53 being raised by action of fingers 142 and shoes 143, to thereby raise the rollers 55 and so free the work for lifting by the carrier.

As the arms 61 and cranks 156 continue to swing downwardly, toward their positions designated 251 and 249 respectively, the carriers 58 are inclined so that the work pieces roll out of the rear notches. This position of the carriers is shown in broken lines in Fig. 9. By this time the down swinging motion of cranks 169 has caused the selector bars 64 at either side of the machine to be elevated if the solenoid lever 189 at that side is raised. Accordingly the ejected work pieces will either roll down the selector bar 64 or down the guide bars 65 depending upon whether or not they are straight within the tolerances for which the machine is adjusted. In the position 249, the crank arm 169 (Fig. 12) is in its lowermost position and switch 198 is opened. This breaks the holding circuit via lead 244 that has kept the relay 216R or relay 216L energized (if the relay had previously been energized by closing of one of the limit switches 195). Accordingly at this phase of the cycle the solenoid levers 189 are lowered.

The unloader arms 61 remain at rest in the position shown in broken lines in Fig. 9 while the cranks 156 swing upwardly to position 252 (Fig. 15). In this position, shown in full lines in Fig. 10, the carriers 58 have been lowered so that the work pieces W in the front notches of the carriers have been caused to roll on the front rollers 51 from the position shown in broken lines in Fig. 9 into the seated position on the rollers shown in full lines in Fig. 10. The correct motion of the work pieces between the full line positions of Figs. 9 and 10 is compelled by guide blocks 250 (Figs. 1 and 8) which have inclined rear faces engaged by the ends of the work pieces at this time. In the full line position of Fig. 10 the fingers 142 of carriers 58 have dropped away from the shoes 143 so that the pressure rollers 55 have been moved into their operative position, clamping the work pieces W to the rollers 51 for rotation by the latter. In position 252 the crank 169 on shaft 149 has swung upwardly slightly above its starting position, and in so doing has caused abutment roller 191 on clutch part 176 to move the pawl 180 to the position thereof shown in Fig. 12 (in the event the pawl had just previously been in the position shown in Fig. 13).

The crank arms 156 and 169 now swing downwardly to position 253, the arms 61 still remaining at rest, the condition being as shown in broken lines in Fig. 10. The switch 198 is reclosed and the work pieces now rotating on the rollers 51 act through switches 195 and relays 216, 217 to energize solenoids in the event there is excessive work piece eccentricity.

Next the unloader arms 61 swing upwardly to position 254, returning the carrier 58 to the initial position thereof shown in full lines in Fig. 8, this being slightly before the 180° position of the cranks 34, wherein the quench chamber pressure head 31 is fully lowered. Shortly thereafter, the crank arms 156 and 169 begin to swing downwardly to position 255. This position, not shown in Figs. 8 through 11, is similar to the broken line position of Fig. 9, differing therefrom only in that the arms 61 are now slightly higher (in the full line position of Fig. 9). The work pieces W are lifted from the rollers 51 and discharged either down guide bars 65 or selector bars 64 depending upon whether or not the solenoids 188 have been energized during the preceding phase of the cycle. As before, the switch 198 is momentarily opened in this position of cranks 169.

The crank arms 156, 169 now swing upwardly to position 256, a repetition of position 252, again setting the pawls 180 in the position shown in Fig. 12. Next arms 156, 169 swing to position 257 and the carrier 58 is again in the position shown in full lines in Fig. 8.

Next, at point 258 the crank arms 156 begin to swing upwardly, and a little later, at point 259 arms 61 and also crank arms 148, Fig. 7, start to swing upwardly. At point 261 arms 156 have reached their highest point, and the parts are in the position shown in full lines in Fig. 11. The parts 44 and 46 of the quenching chamber pressure head assembly 31 are at this time elevated enough for the carriers 58 to pass beneath them, the cranks 34 being slightly beyond their 270° position. Also the mechanism shown in Fig. 7 has now operated to raise the pressure head 53 and rollers 55 high enough to allow the rear of the carrier and the outer ends of arms 61 and 63 to pass beneath them. At point 262 the cranks 156 again begin to swing downwardly, and a little later, at point 263 the arms 61 reach their limit position shown in broken lines in Fig. 8. Intermediate of points 262 and 263 the carrier 58 is in the position shown in broken lines in Fig. 11, where the fingers are lowered sufficiently to pass under the rear work pieces on quenching chamber rollers 26, 27. At point 264 the arms 61 are still at their limit position and the cranks 156 have returned to their original position, bringing the carrier 58 to the broken line position of Fig. 8, wherein it engages under work pieces W on the rollers 26, 27.

At point 264 the arms 61 begin to move counterclockwise which causes the carrier 58 to lift the work pieces W from roller 26, 27 and carry them toward the testing station, i. e. the position of the carrier shown in full lines in Fig. 8. When this motion is completed, at the 360° position of the cranks 34, one cycle has been completed.

The foregoing disclosure of the machine and its operation is made by way of example to illustrate and explain the inventive principles involved, and not by way of limitation, for, as those skilled in the art will recognize, various changes, and modifications may be readily made without departing from the scope of the appended claims.

We claim as our invention:

1. A rolling quench machine having a quenching chamber containing lower rollers for supporting work, upper rollers and supporting means carrying them and arranged to be lowered and raised to carry said upper rollers into and from operative position wherein they clamp the work upon the lower rollers, means to rotate at least one of the rollers to thereby rotate the work during the quenching operation, means to continuously supply quenching liquid to the chamber, the wall structure of the chamber including a stationary wall portion of such height that overflow maintains the level of the liquid below work supported on the lower rollers, said chamber wall structure also including a movable wall portion adapted in one position thereof to cooperate with the stationary wall portion to increase the overflow height of the chamber structure sufficiently to raise the level of the liquid above the work supported on the lower rollers, and power operated means to lower and raise the supporting means for the upper rollers and, in time therewith, to move said movable wall portion to and from said one position thereof.

2. A roller quench machine according to claim 1 in which said movable wall portion is connected to the supporting means for the upper rollers, to thereby move in unison with said supporting means.

3. A roller quench machine according to claim 2 in which the supporting means for the upper rollers is pivoted for the motion thereof which effects raising and lowering of the upper rollers and said movable wall portion, and there is a rotary crank and a pitman connecting the crank and support means for effecting such motion.

4. A roller quench machine according to claim 3 in which there is an electric motor for driving said crank, and means operated in time with the crank to stop the motor when said supporting means is lowered and then restart it after a time interval.

5. A roller quench machine according to claim 4 in which said means operated in time with the crank is arranged to stop the motor again when said supporting means is partially raised and then restart it after a time interval.

6. A roller quench machine comprising a base having a quenching chamber and means to supply quenching liquid thereto, lower rollers in the chamber mounted for rotation about horizontal axes on brackets supported by said base, means for adjusting said brackets along the base in the direction of the roller axes to vary the spacing of said rollers along the chamber, a pressure head and means including a rotary crank for raising and lowering the same relative to the base, upper rollers mounted on brackets carried by the pressure head for rotation about axes parallel to those of the lower rollers, means for adjusting the brackets for the upper rollers along the pressure head in the direction of the roller axes for varying the spacing of the upper rollers along the chamber, and means for adjusting the upper brackets vertically on the pressure head.

7. A roller quench machine according to claim 6 in which the upper rollers are journaled in plungers that are slidable in the brackets on the pressure head, springs are disposed between the brackets and the plungers to exert a downward force on the upper rollers, and there are means to adjust the initial loadings of the springs.

8. A roller quench machine according to claim 6 in which the means to supply the liquid includes an inlet channel extending substantially the full width of said chamber in the direction of the axes of the rollers, means to adjust the rate of fluid flow to said channel, and means to adjust the relative rates of fluid flow from the channel into the quenching chamber in different regions along the width thereof.

9. A rolling quench machine having a quenching chamber and means to supply quenching liquid to said chamber, lower rollers in said chamber for supporting work, upper rollers and supporting means therefor arranged for motion to lower them into and raise them from operative relation with the lower rollers, lower test station rollers for supporting work, upper test station rollers and supporting means therefor arranged for motion to lower them into and raise them from operative relation to the lower test station rollers, means to transfer work from the quenching chamber lower rollers to the test station lower rollers, and means for raising and lowering both of said supporting means and in time therewith operating said work transfer means.

10. A rolling quench machine according to claim 9 in which there is means to rotate at least one of the quench chamber lower rollers and at least one of the test station lower rollers.

11. A rolling quench machine according to claim 10 in which there is means for testing work that is rotating on the test station lower rollers, the work transfer means is arranged to eject work from the test station lower rollers prior to transferring other work thereto, and there is a selector means operable by the testing means to cause such ejection to be in different paths for acceptable work and for unacceptable work.

12. A rolling quench machine according to claim 11 in which the work transfer means comprises a work carrier, a pair of arms swingable on spaced centers and pivoted to the carrier on spaced centers, a crank carrying one arm to move the center on which said one arm swings, means to swing the other arm to effect substantially translatory motion of the carrier between the quench chamber lower rollers and the test station lower rollers, and means to turn said crank to tilt the carrier to eject work from the test station lower rollers and to engage under work on the quench chamber lower rollers.

13. A rolling quench machine according to claim 12 in which there are rotating cam means for swinging said other arm and said crank in time with the raising and lowering of said support means for the upper rollers.

14. A rolling quench machine according to claim 11 in which the selector means comprises an oscillating drive member and a member selectively driven thereby, a pawl pivoted on one member for movement between positions wherein it is respectively engageable or unengageable with an abutment on the other member, resilient detent means on said one member to retain the pawl in either of said positions, means operated by the testing means to move the pawl to one position, and other means operable to move the pawl to the other of said positions.

References Cited in the file of this patent

UNITED STATES PATENTS

| | | |
|---|---|---|
| 399,381 | Coffin | Mar. 12, 1889 |
| 976,891 | Machlet | Nov. 29, 1910 |
| 1,448,878 | Smith | Mar. 20, 1923 |
| 1,933,225 | Smith | Oct. 31, 1933 |
| 1,967,317 | Mogford et al. | July 24, 1934 |
| 1,993,754 | Smith | Mar. 12, 1935 |
| 2,102,819 | Ronci | Dec. 21, 1937 |
| 2,188,257 | Urschel | Jan. 23, 1940 |
| 2,258,811 | Ray | Oct. 14, 1941 |
| 2,333,344 | Smith et al. | Nov. 2, 1943 |
| 2,402,068 | Meador | June 11, 1946 |
| 2,494,984 | Bauer | Jan. 17, 1950 |
| 2,674,900 | Unterman | Apr. 13, 1954 |